(12) United States Patent
Tonegawa

(10) Patent No.: US 9,800,761 B2
(45) Date of Patent: Oct. 24, 2017

(54) IMAGE PROCESSING SYSTEM AND IMAGE PROCESSING APPARATUS FOR SENDING IMAGE DATA

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/380,923

(22) PCT Filed: Feb. 14, 2013

(86) PCT No.: PCT/JP2013/000816
§ 371 (c)(1),
(2) Date: Aug. 25, 2014

(87) PCT Pub. No.: WO2013/128826
PCT Pub. Date: Sep. 6, 2013

(65) Prior Publication Data
US 2015/0046976 A1 Feb. 12, 2015

(30) Foreign Application Priority Data

Feb. 28, 2012 (JP) ................................. 2012-041604

(51) Int. Cl.
*H04L 29/06* (2006.01)
*H04N 1/44* (2006.01)
(Continued)

(52) U.S. Cl.
CPC ........... *H04N 1/4406* (2013.01); *H04L 63/08* (2013.01); *H04N 1/00408* (2013.01);
(Continued)

(58) Field of Classification Search
USPC ............................................................ 726/3
See application file for complete search history.

(56) References Cited

U.S. PATENT DOCUMENTS

2004/0205099 A1* 10/2004 Hagiwara ............... H04L 29/06
709/200
2009/0172811 A1* 7/2009 Homma ............. H04N 1/00411
726/19

FOREIGN PATENT DOCUMENTS

CN 101626440 A 1/2010
CN 102238008 A 11/2011
(Continued)

OTHER PUBLICATIONS

International Search Report and Written Opinion for PCT/JP2013/000816, dated May 21, 2013.
(Continued)

*Primary Examiner* — Jason Lee
(74) *Attorney, Agent, or Firm* — Canon USA, Inc. I.P. Division

(57) ABSTRACT

An image processing system receives an input of authentication information from a user, and authenticates the user based on the received authentication information. The image processing system further selects a folder setting method in a case where an operation key for setting a folder of the user as a destination of image data is operated, sets the folder according to the selected folder setting method in response to the operation of the operation key, and sends the image data to the set folder as the destination.

6 Claims, 13 Drawing Sheets

(51) Int. Cl.
*H04N 1/00* (2006.01)
*H04N 1/32* (2006.01)

(52) U.S. Cl.
CPC . *H04N 1/32122* (2013.01); *H04N 2201/3205* (2013.01); *H04N 2201/3207* (2013.01); *H04N 2201/3276* (2013.01)

(56) References Cited

FOREIGN PATENT DOCUMENTS

| | | |
|---|---|---|
| EP | 2075692 A1 | 7/2009 |
| EP | 2381387 A2 | 10/2011 |
| JP | 2002-169680 A | 6/2002 |
| JP | 2006-101484 A | 4/2006 |
| JP | 2007-306383 A | 11/2007 |
| JP | 2008-083962 A | 4/2008 |
| JP | 2009-177763 A | 8/2009 |
| JP | 2010-135896 A | 6/2010 |
| JP | 2011-028329 A | 2/2011 |
| JP | 2011-232884 A | 11/2011 |
| JP | 2012-027662 A | 2/2012 |
| KR | 10-2008-0010088 A | 1/2008 |
| KR | 10-2011-0074733 A | 7/2011 |

OTHER PUBLICATIONS

European Application No./Patent No. 13754415.1-1903/2820836 PCT/JP2013000816, The extended European search report, dated Aug. 4, 2015.

Office Action for Korean patent application No. 10-2014-7027092, dated Aug. 10, 2015, with English translation.

\* cited by examiner

FIG.8

USER SETTINGS (A1001)

■ HOST NAME OF FOLDER
server.abc.co.jp ~801

■ FOLDER PATH
/home/tanaka ~802

■ SMTP AUTHENTICATION USER NAME
tanaka ~803

■ SMTP AUTHENTICATION PASSWORD
secret55 ~804

FIG.9

ADDRESS BOOK NEW REGISTRATION

■ PROTOCOL  | SMB | ~901

■ HOST NAME OF FOLDER
| server.abc.co.jp | ~902

■ FOLDER PATH
| /home/common | ~903

■ USER NAME
| common | ~904

■ PASSWORD  ■ ENTER PASSWORD FOR EACH TRANSMISSION
| secret66 | ~905
| ON |
906

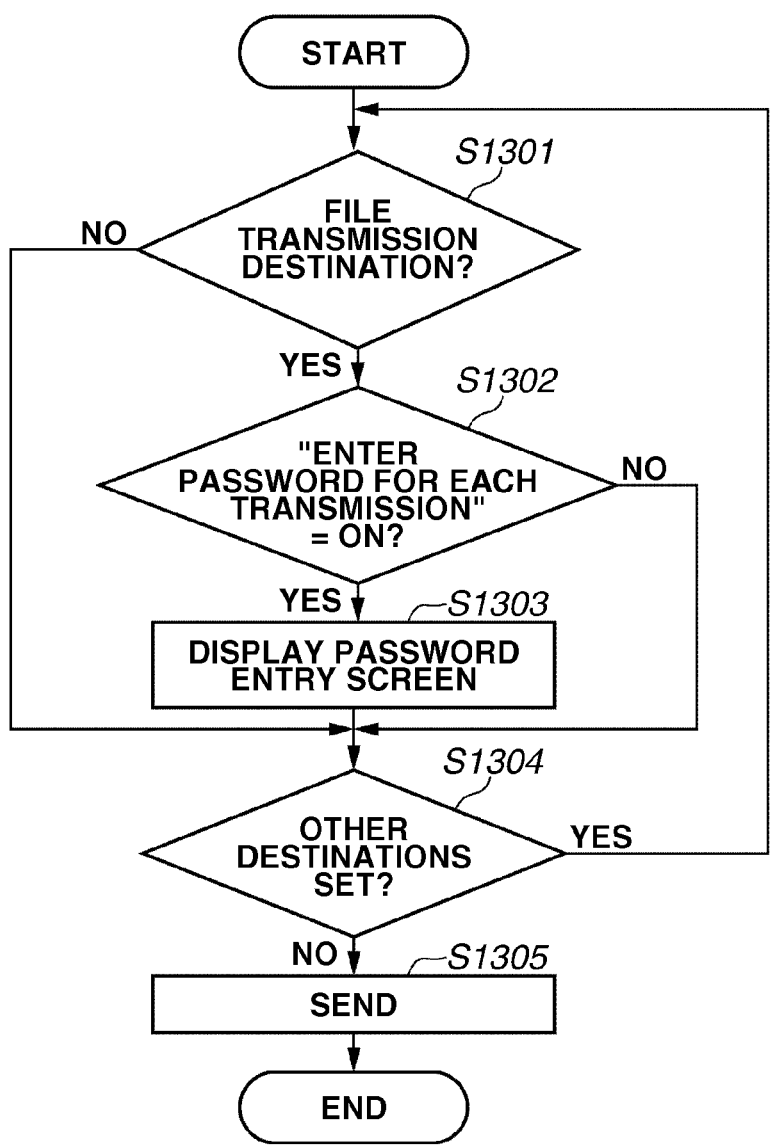

IMAGE PROCESSING SYSTEM AND IMAGE PROCESSING APPARATUS FOR SENDING IMAGE DATA

TECHNICAL FIELD

The present invention relates to an image processing system and an image processing apparatus for sending image data.

BACKGROUND ART

Image processing apparatuses provided with an operation key "send mail to myself" are conventionally known. For example, in Japanese Patent Application Laid-Open No. 2006-101484, when a user operates an operation key "send mail to myself", an e-mail address of the user operating the image processing apparatus is set as a destination of image data. Thus, the user can reduce the time and effort to input his/her e-mail address in sending the image data to his/her mail address.

In Japanese Patent Application Laid-Open No. 2006-101484, an operation key "send mail to myself" for setting an e-mail address is discussed. In addition to the "send mail to myself" key, an operation key "send file to myself" can be provided to image processing apparatuses. Sending a file means, for example, to send image data using a protocol such as Server Message Block (SMB), File Transfer Protocol (FTP), or the like.

In the image processing apparatus including such a "send file to myself" operation key, in response to an operation of the "send file to myself" operation key, a folder of the user operating the image processing apparatus is set as the destination of image data. Accordingly, the user can reduce the time and effort to input folder information indicating the folder of the user's own in sending (storing) image data to the folder of the user's own. The folder information includes folder location information such as a host name indicating the host managing the folder and a path indicating a location of the folder in the host.

In the operation of "send file to myself", whether which folder is to be used as the folder of "myself" varies depending on the installation environment of the image processing apparatus. In the known technique, however, the "myself" folder is set with a fixed method. Consequently, in some cases, the folder does not suit the installation environment of the image processing apparatus.

CITATION LIST

Patent Literature

PTL 1: Japanese Patent Application Laid-Open No. 2006-101484

SUMMARY OF INVENTION

The present invention is directed to a mechanism for selectively switching methods for setting a user's folder.

One aspect of the present invention provides, an image processing system including a reception unit configured to receive an input of authentication information from a user, an authentication unit configured to authenticate the user based on the authentication information received by the reception unit, an operation key configured to set a folder of the user as a destination of image data, a selection unit configured to select a folder setting method in a case where the operation key is operated, a setting unit configured to set a folder according to the folder setting method selected in advance by the selection unit in response to an operation of the operation key, and a transmission unit configured to send the image data to the folder set by the setting unit as the destination.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an operation screen on the MFP according to the exemplary embodiment of the present invention.

FIG. 9 illustrates an operation screen on the MFP according to the exemplary embodiment of the present invention.

FIG. 13 is a flowchart illustrating an operation performed if a start key is operated in the MFP according to the exemplary embodiment of the present invention.

DESCRIPTION OF EMBODIMENTS

Various exemplary embodiments, features, and aspects of the invention will be described in detail below with reference to the drawings.

Figure 1:
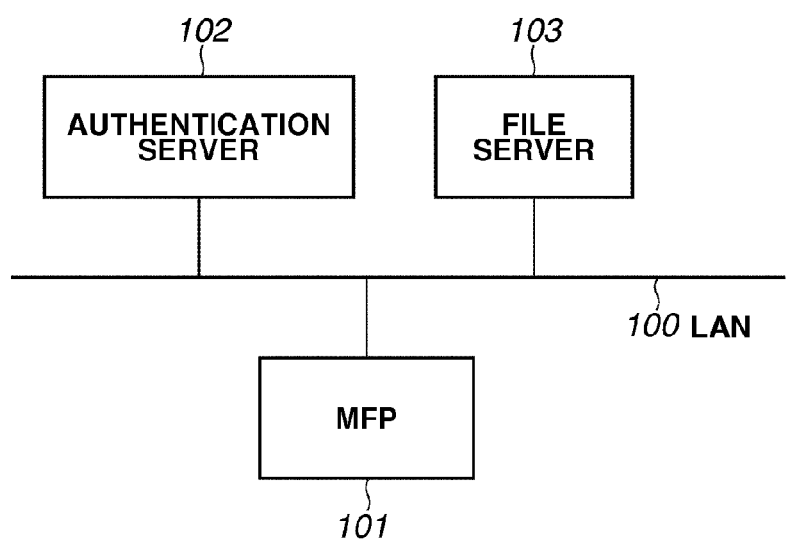
FIG. 1 illustrates an overview of an image processing system according to an exemplary embodiment of the present invention.

FIG. 1 illustrates an overview of an image processing system. On a local area network (LAN) 100, an MFP 101, an authentication server 102, and a file server 103 are connected to each other in a communicable manner. The MFP 101 is an example of an image processing apparatus. The authentication server 102 is an example of an authentication apparatus. The file server 103 is an example of a file management apparatus.

The MFP 101 can send a file of image data using SMB or FTP to a folder in the file server 103 as the destination. In addition to the file server 103, the MFP 101 can set a folder in a client personal computer (PC) (not illustrated) as the destination. The MFP 101 can send image data by e-mail via a mail server (not illustrated). The image processing system includes the MFP 101, the authentication server 102, and the file server 103. Alternatively, the image processing system may include only the MFP 101 and the authentication server 102, or only the MFP 101.

Figure 2:
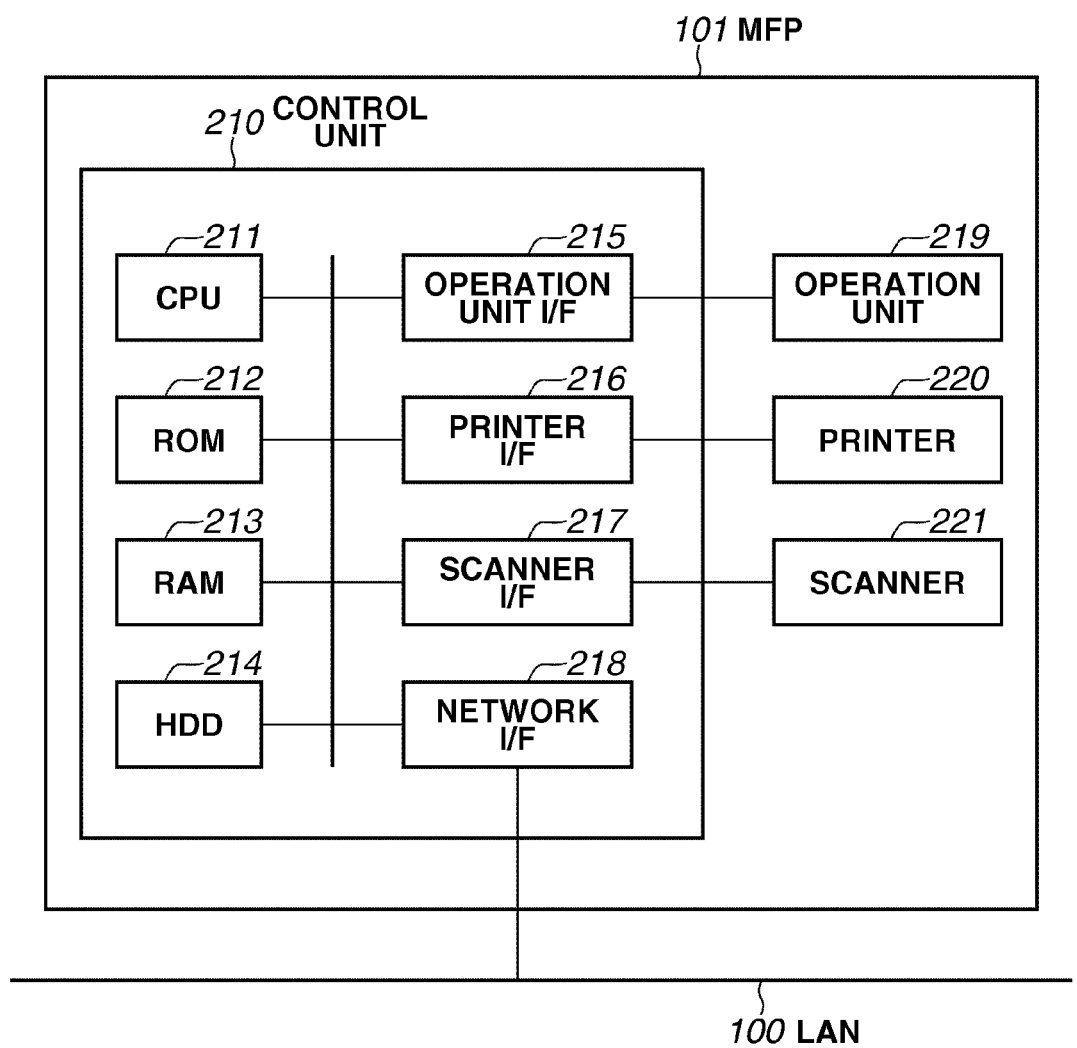
FIG. 2 is a block diagram illustrating a configuration of a multifunction peripheral (MFP) according to the exemplary embodiment of the present invention.

FIG. 2 is a block diagram illustrating a configuration of the MFP 101. A control unit 210 including a central processing unit (CPU) 211 entirely controls operations in the MFP 101. The CPU 211 reads a control program stored in a read-only memory (ROM) 212, and executes various types of control such as read control and transmission control. A random access memory (RAM) 213 serves as a temporary storage area such as a main memory and a work area of the CPU 211.

According to the present exemplary embodiment, it is described that, in the MFP 101, one CPU 211 executes each process illustrated in flowcharts in FIG. 10 to FIG. 13 described below with use of one memory (the RAM 213 or a hard disk drive (HDD) 214). However, other configurations can be employed. For example, a plurality of CPUs and a plurality of RAMs or HDDs can cooperate with each other to perform each process illustrated in the flowcharts in FIG. 10 to FIG. 13.

The HDD 214 stores image data and various programs. An operation unit interface (I/F) 215 connects an operation unit 219 and the control unit 210. The operation unit 219 includes a liquid crystal display unit having a touch panel function, and a keyboard.

A printer I/F 216 connects a printer 220 and the control unit 210. Image data to be printed by the printer 220 is transferred from the control unit 210 via the printer I/F 216, and printed on a recording medium by the printer 220.

A scanner I/F 217 connects a scanner 221 and the control unit 210. The scanner 221 reads an image on an original document, generates image data (an image file), and inputs the image data to the control unit 210 via the scanner I/F 217. The MFP 101 can send the image data (image file) generated by the scanner 221 as a file or a file attached to an e-mail.

A network I/F 218 connects the control unit 210 (the MFP 101) to a LAN 100. The network I/F 218 sends image data and information to an external device (for example, the authentication server 102 and the file server 103) on the LAN 100, and receives various types of information from an external device on the LAN.

Figure 3:
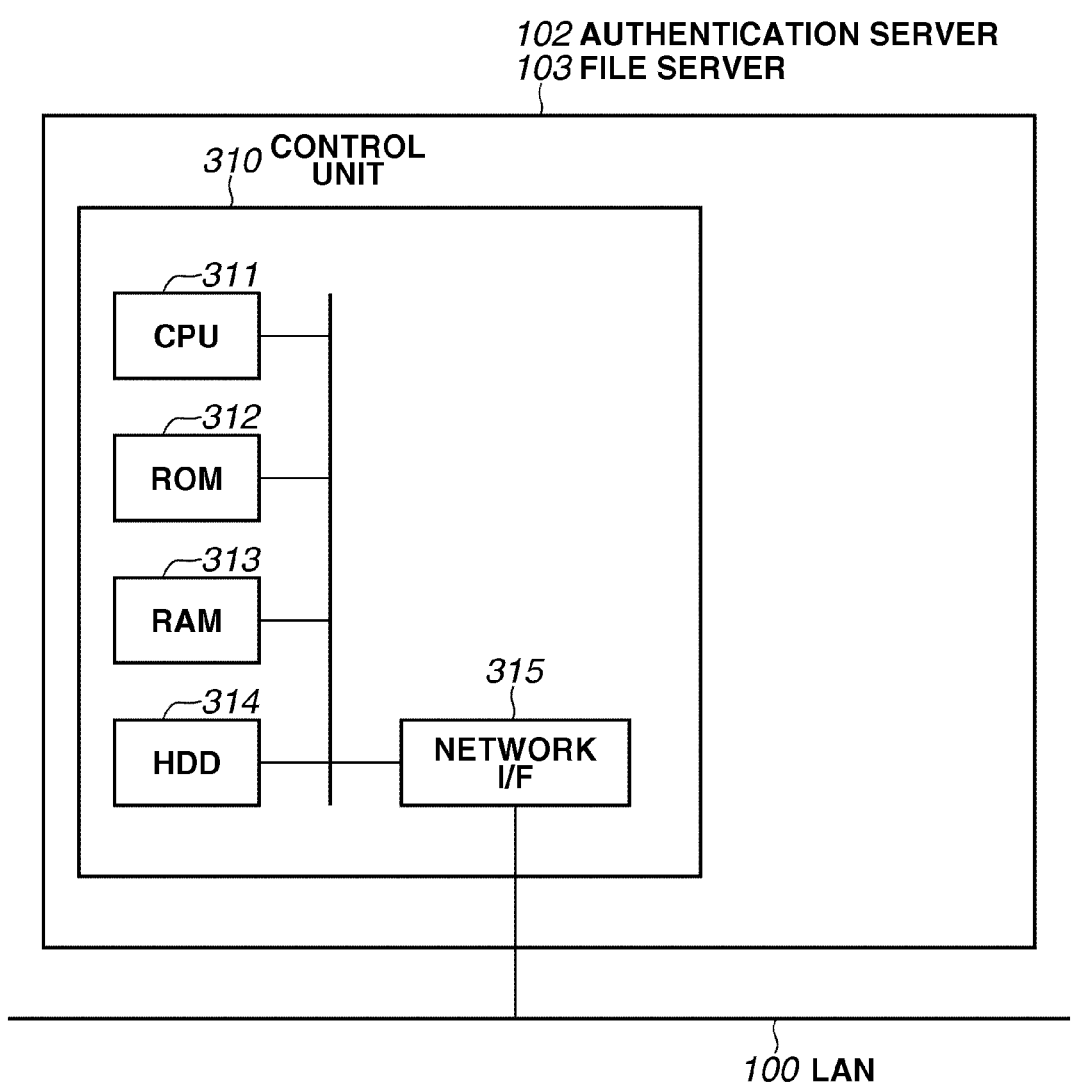
FIG. 3 is a block diagram illustrating a configuration of an authentication server and a file server according to the exemplary embodiment of the present invention.

FIG. 3 is a block diagram illustrating a configuration of the authentication server 102. A control unit 301 including a CPU 311 entirely controls operations in the authentication server 102. The CPU 311 reads a control program stored in a ROM 312, and executes various types of control processing. A RAM 313 serves as a temporary storage area such as a main memory and a work area of the CPU 311. A HDD 314 stores image data and various programs.

A network I/F 315 connects the control unit 310 (the server 102) to the LAN 100. The network I/F 315 sends and receives various types of information to and from another device on the LAN 100. The configuration of the file server 103 is similar to that of the authentication server 102, and consequently, its description is omitted.

Figure 4:
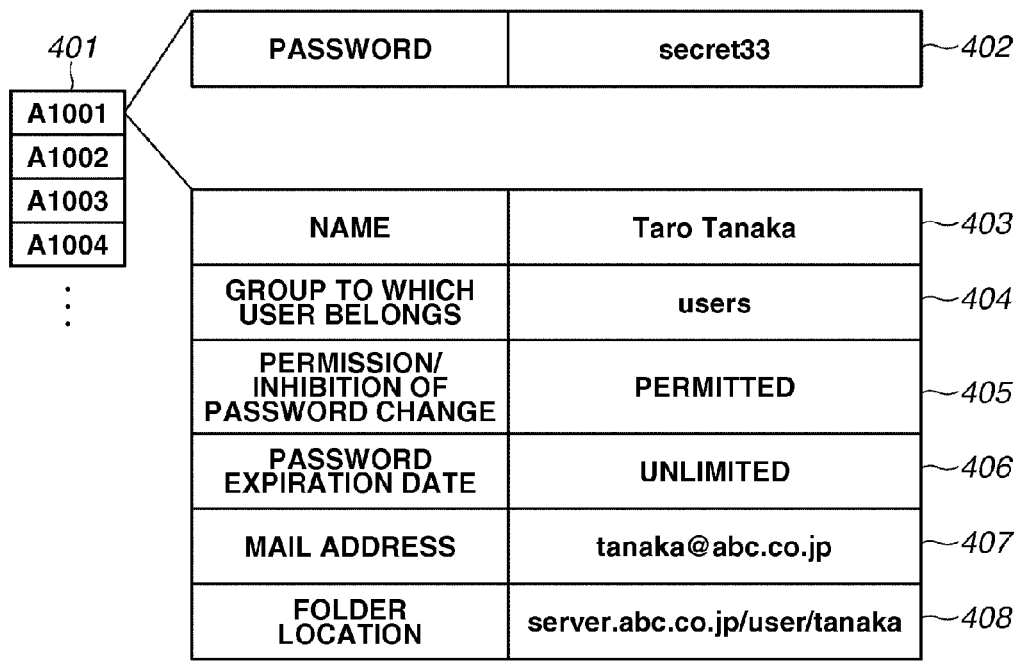
FIG. 4 illustrates information managed by the authentication server according to the exemplary embodiment of the present invention.

FIG. 4 illustrates information managed by the authentication server 102 in the HDD 314. The authentication server 102 manages a domain including the image processing system illustrated in FIG. 1. The authentication server 102 further manages, for each user, information pieces 401 and 402 necessary for authentication of a user, and information pieces 403 to 408 about the user. The information 401 is a user name uniquely specifies a user. For example, the information 401 is an employee code of a company in which the MFP 101 is installed.

FIG. 4 illustrates information of a user corresponding to a user name of A1001. When the user of A1001 starts to use the MFP 101, the user needs to input the user name "A1001" and its password "secret33". Authentication information (the user name and the password) input to the MFP 101 is sent to the authentication server 102. The authentication server 102 compares the authentication information (the user name and the password) sent from the MFP 101 to the authentication information managed as the information pieces 401 and 402. If the information corresponds to each other, the authentication server 102 notifies the MFP 101 of authentication OK (successful in authentication). If the authentication information does not correspond to each other, the authentication server 102 notifies the MFP 101 of authentication NG (failure in authentication).

The information pieces 403 to 408 are notified to the MFP 101 together with authentication OK if the authentication information corresponds to each other. The information 403 indicates that the name of the user A1001 is "Taro Tanaka". The information 404 indicates that the user A1001 belongs to a group "users". The information 405 indicates that the password managed as the information 402 can be changed by the user A1001 himself. If the information 405 is set to "disabled", the password in the information 402 can be changed only by an administrator.

The information 406 indicates an expiration date of the password manages as the information 402. If the information 406 is set to "unlimited", the password in the information 402 can be unlimitedly used. If an expiry date is set to the information 406, the user is required to change the password when the expiry date approaches. The information 407 indicates an e-mail address of the user A1001. The user A1001 can receive an electronic mail sent to the e-mail address that is managed as the information 407 as the destination. The information 408 indicates a location in which a folder of the user A1001 is placed. The user A1001 can access the folder indicated by the information 408, and obtain data stored in the folder.

Figure 5:
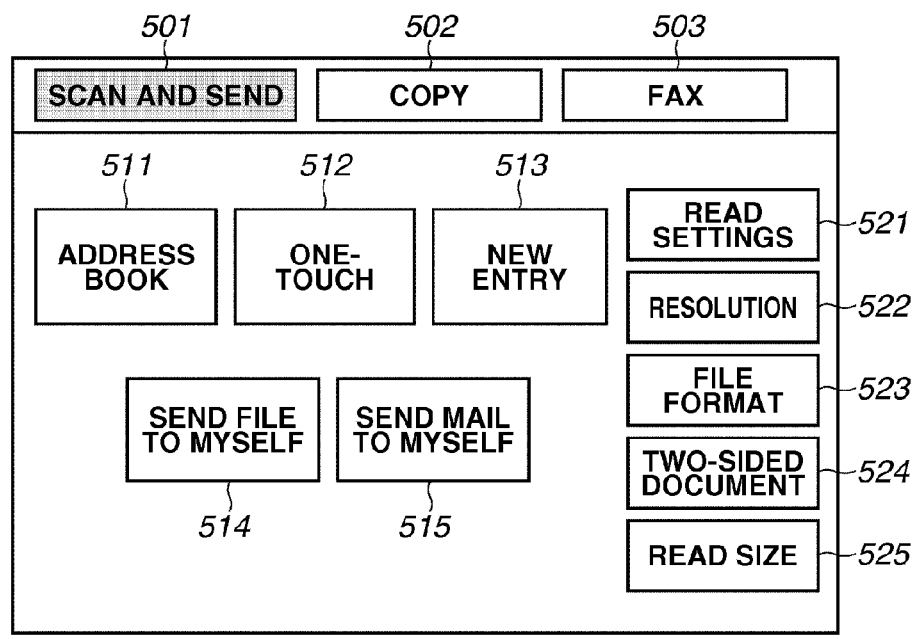
FIG. 5 illustrates an operation screen on the MFP according to the exemplary embodiment of the present invention.

FIG. 5 illustrates an example of an operation screen displayed on the operation unit 219. On the screen illustrated in FIG. 5, a user can operate any of operation keys 501 to 503 to select a function. FIG. 5 illustrates a state that the operation key 501 is being selected. FIG. 5 is an example in which "scan and send", "copy", and "fax" are displayed as the functions. However, the MFP 101 may include functions other than these functions.

After selecting the operation key 501, the user further operates any of the operation keys 511 to 515 to set a destination of image data to be sent. If the user operates the operation key 511, the content in the address book stored in the HDD 214 is displayed. Then, the user can refer to the content registered in the address book, and set the content as the destination of the image data.

If the user operates the operation key 512, a list of one-touch keys is displayed. With the one-touch key, one or a plurality of destinations is associated in advance. If the user operates the one-touch key, the content associated with the one-touch key can be set as the destination of the image data. If the user operates the operation key 513, a screen for receiving an input of new destination information from the user is displayed. The user can input destination information via the displayed screen, and set the information as the destination of the image data.

The operation key 514 is used when the user wants to set a folder of the user as the destination of the image data. If the user operates the operation key 514, the folder of the user is automatically set as the destination of the image data. (This operation is described below in detail.) The operation key 515 is used when the user wants to set an e-mail address of the user as the destination of the image data. If the user operates the operation key 515, the e-mail address of the user is automatically set as the destination of the image data. (This operation is described below in detail.)

The operation key 521 is used to perform read setting such as a color/monochrome setting. The operation key 522 is used to set a reading resolution. The operation key 523 is used to set a file format of the image data to be sent. The operation key 524 is used to perform setting of a one-sided/two-sided reading. The operation key 525 is used to set a reading size.

Figure 6:
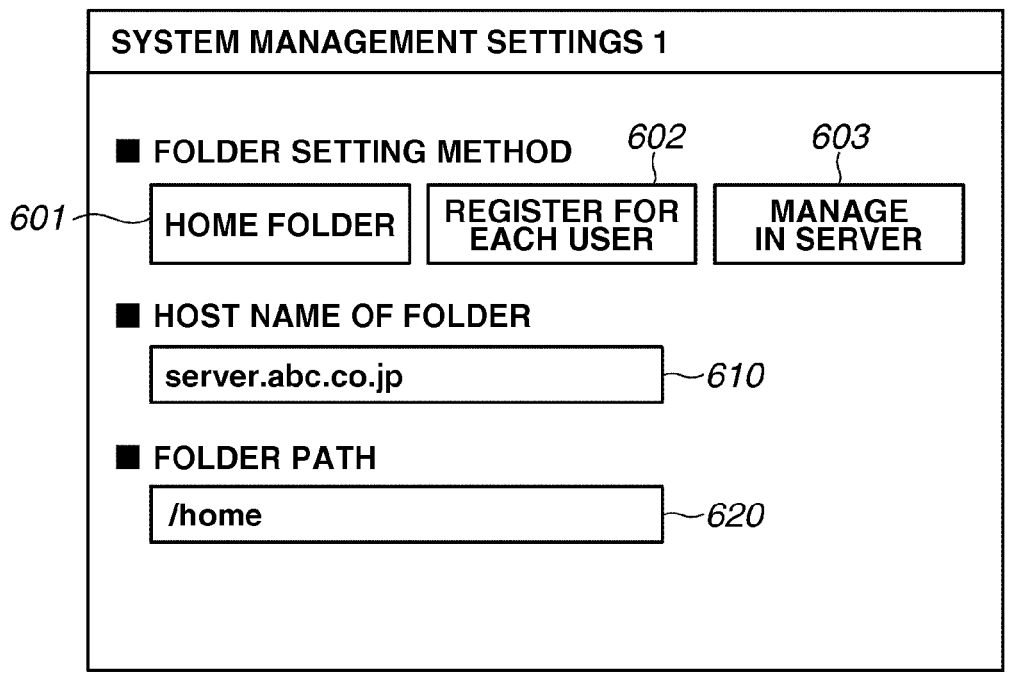
FIG. 6 illustrates an operation screen on the MFP according to the exemplary embodiment of the present invention.

FIG. 6 illustrates an example of an operation screen displayed on the operation unit 219. Only the administrator can operate the screen in FIG. 6. In the case that a general user operates the MFP 101, the screen in FIG. 6 is not displayed. The administrator operates any of operation keys 601 to 603 to select a folder setting method in a case where the operation key 514 is operated.

The MFP 101 includes three folder setting methods, namely "home folder", "register for each user", and "manage in server".

In the setting method "home folder", the administrator registers, in the MFP 101 in advance, a host name of a folder and a part of a path to be commonly used by a plurality of users, and these information pieces are set as the destination of image data. The administrator registers a host name of a folder and a part of a path to be used when "home folder" is selected as information pieces 610 and 620 in FIG. 6. In this setting method, for example, folders of individual users can be provided in the same host and/or in the same folder. Consequently, the administrator can easily manage the folders.

In the setting method "register for each user", a general user registers a host name and a path of a folder of the user in the MFP 101 in advance, and these information pieces are set as the destination of image data. The registration process is described below in detail with reference to FIG. 8. In this setting method, each user can register an arbitrary folder as his/her own folder. Consequently, the method is easy for the user to use.

In the setting method "manage in server", information managed as the information 408 in FIG. 4 in the authentication server 102 is set as the destination of the image data. In this setting method, folders of each of the users are managed in a unified manner by the server. Consequently, when the folder information needs to be updated, the time and effort for update can be reduced.

Since the MFP 101 includes the three folder setting methods, i.e., "home folder", "register for each user" and "manage in server", the MFP 101 can selectively switch the folder setting methods according to the environment that the MFP 101 is installed. More specifically, if the user wants to perform the folder management easily, "home folder" may be selected, if the user wants to prioritize the usability, "register for each user" may be selected, and if the user wants to manage folders in a unified manner by the server, "manage in server may be selected. When the operation key 602 or 603 is operated, fields of the information pieces 610 and 620 may be grayed out to prevent the information pieces 610 and 620 from being input.

Figure 7:
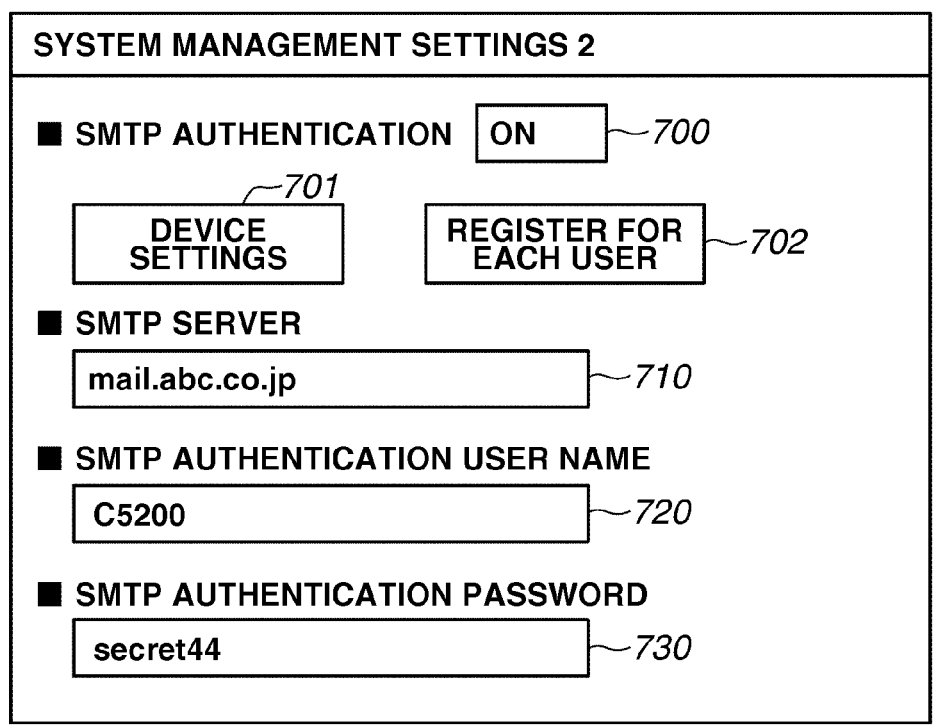
FIG. 7 illustrates an operation screen on the MFP according to the exemplary embodiment of the present invention.

FIG. 7 illustrates an example of an operation screen displayed on the operation unit 219. Only the administrator can operate the screen in FIG. 7. When a general user operates the MFP 101, the screen in FIG. 7 is not displayed. The administrator performs setting of Simple Mail Transfer Protocol (SMTP) authentication via the screen in FIG. 7. The SMTP authentication is a function in which a mail server that distributes electronic mails performs authentication to prevent transmission of an improper electronic mail with a false mail address. In a case where a mail server to be used for transmission of an electronic mail from the MFP 101 performs the SMTP authentication, the administrator sets information 700 to "ON". If the SMTP authentication is not necessary, the administrator sets the information 700 to "OFF".

If the information 700 is set to "ON", the administrator needs to operate any of operation keys 701 and 702 to select an authentication information setting method to be used in the SMTP authentication. If the administrator operates the operation key 701, the authentication information registered as the information pieces 720 and 730 by the administrator via the screen in FIG. 7 is used for the SMTP authentication. The information pieces 720 and 730 are authentication information commonly used to a plurality of users who operate the MFP 101.

If the administrator operates the operation key 702, the authentication information registered by a general user in the MFP 101 in advance is used for the SMTP authentication. The registration process is described below in detail with reference to FIG. 8. The information 710 indicates an address of the mail server used to send the electronic mail from the MFP 101.

FIG. 8 illustrates an example of an operation screen displayed on the operation unit 219. The screen in FIG. 8 is displayed when a general user operates the MFP 101. As information pieces 801 and 802, the user can register a host name and a path of a folder of the user (in the example in FIG. 8, the user A1001). The information pieces registered via the screen in FIG. 8 are set as the destination of image data when "register for each user" (the operation key 602 in FIG. 6) is selected.

As information pieces 803 and 804, the user can register the authentication information (the user name and the password) to be used for the SMTP authentication. The information pieces registered via the screen in FIG. 8 is set as the authentication information for the SMTP authentication when "register for each user" (the operation key 702 in FIG. 7) is selected.

FIG. 9 illustrates an example of an operation screen displayed on the operation unit 219. The screen in FIG. 9 is displayed when a general user operates the MFP 101. Via the screen in FIG. 9, the user can register a destination to the address book. In this example, a registration of a destination to which image data is sent with SMB that is an example of the file transmission is described.

Information 901 indicates a protocol selected by the user. In the MFP 101, any of SMB and FTP can be selected. However, protocols other than SMB and FTP may be included in options.

Information pieces 902 and 903 indicate location information (a host name and a path) of a folder to be the destination of the image data. Information pieces 904 and 905 indicate the authentication information (the user name and the password) necessary for access to the folder specified by the information pieces 902 and 903.

Information 906 indicates whether to cause a user to input (check) the password of the information 905 for each transmission. If the information 906 is set to "ON", when image data is actually sent, the user needs to input the password again even if the password is registered as the information 905.

Figure 10:
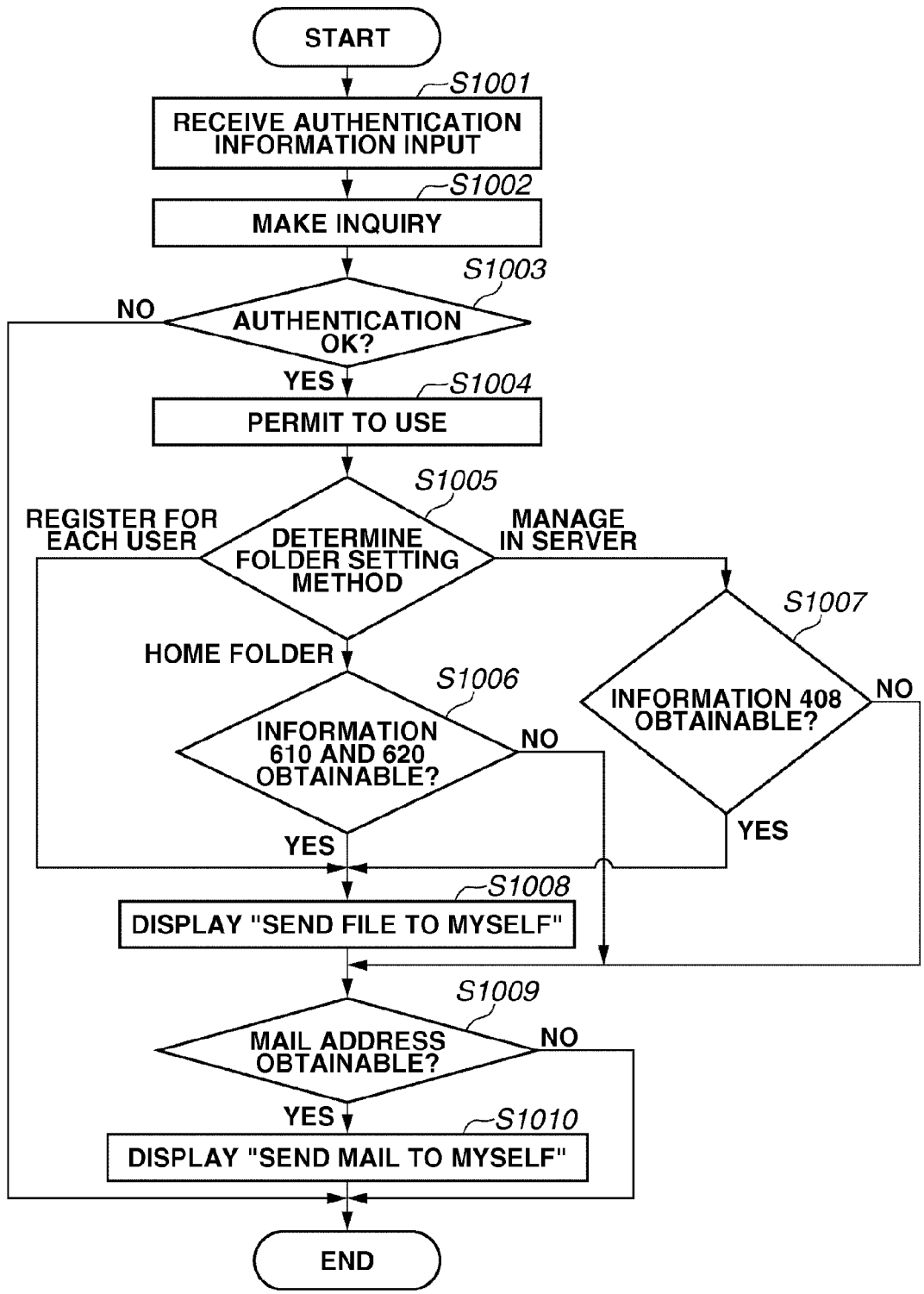
FIG. 10 is a flowchart illustrating a login operation in the MFP according to the exemplary embodiment of the present invention.

FIG. 10 is a flowchart illustrating a login operation (a series of operations performed when a user starts to use the MFP 101) performed in the MFP 101. Each operation (step) illustrated in the flowchart in FIG. 10 is realized by the CPU 211 in the MFP 101 by executing a control program stored in the HDD 214.

In step S1001, the CPU 211 receives an input of authentication information (a user name and a password) from a user via the screen displayed on the operation unit 219 (reception).

In step S1002, the CPU 211 sends the authentication information received in step S1001 to the authentication server 102, and requests the authentication server 102 to perform the user authentication (makes an inquiry about whether the user can use the MFP 101).

In step S1003, the CPU 211 determines whether the authentication of the content notified from the authentication server 102 is successful. If the authentication of the content is successful (YES in step S1003), the process proceeds to step S1004. In step S1004, the CPU 211 permits the user to use the MFP 101. On the other hand, the authentication of the content is failed (NO in step S1003), the process ends. (Alternatively, the process returns to step S1001, and the screen for inputting the authentication information is displayed again.)

In step S1005, the CPU 211 determines which folder setting method has been selected by the administrator in advance via the operation screen in FIG. 6. If the selected folder setting method is "register for each user", the process proceeds to step S1008. If the selected folder setting method is "home folder", the process proceeds to step S1006. If the selected folder setting method is "manage in server", the process proceeds to step S1007.

As described above, the MFP 101 includes three folder setting methods, and thus the CPU 211 obtains the folder location information using the folder setting method selected by the administrator in advance. If "home folder" has been selected, the CPU 211 obtains the folder location information registered as the information pieces 610 and 620 in FIG. 6. If "register for each user" has been selected, the CPU 211 obtains the folder location information registered as the information pieces 801 and 802 in FIG. 8. If "manage in server" is selected, the CPU 211 obtains the folder location information which is registered as the information 408 in FIG. 4 to the authentication server 102 and notified to the MFP 101 together with the information of the successful in the authentication.

In step S1006, the CPU 211 determines whether the information pieces 610 and 620 in FIG. 6 can be obtained. If the information pieces 610 and 620 cannot be obtained while "home folder" is selected (NO in step S1006), the CPU 211 cannot perform the setting of the folder using the operation key 514. In such a case, the process skips step S1008 and proceeds to step S1009. The CPU 211 cannot obtain the information pieces 610 and 620, for example, in a case where the information pieces 610 and 620 is not registered in the MFP 101.

Similarly, in step S1007, the CPU 211 determines whether the information 408 in FIG. 4 can be obtained. If the information 408 cannot be obtained while "manage in server" is selected (NO in step S1007), the CPU 211 cannot perform the setting of the folder using the operation key 514. In such a case, the process skips step S1008 and proceeds to step S1009. The CPU 211 cannot obtain the information 408, for example, in a case where the information 408 is not registered in the authentication server 102.

On the other hand, if "register for each user" is selected, the CPU 211 obtains the folder location information registered as the information pieces 801 and 802 in FIG. 8, and uses the information pieces. In this example, irrespective of whether the information pieces 801 and 802 can be obtained or not, the process proceeds to step S1008. This is because, if "register for each user" is selected, even if the information pieces 801 and 802 has not registered at the time the user logs in to the MFP 101, the CPU 211 can receive an input of the folder location information in step S1103 in FIG. 11 described below.

In step S1008, the CPU 211 displays the operation key 514 on the screen in FIG. 5. Whereas, if the CPU 211 determines NO in step S1006 or S1007, the process in step S1008 is skipped, and the process proceeds to step S1009. Thus, the operation key 514 is not displayed on the screen in FIG. 5.

In step S1009, the CPU 211 determines whether an e-mail address which is registered as the information 407 in FIG. 4 in the authentication server 102 and notified together with the information of the successful in the authentication can be obtained. If the CPU 211 determines that the e-mail address can be obtained (YES in step S1009), the process proceeds to step S1010. In step S1010, the CPU 211 displays the operation key 515 on the screen in FIG. 5.

If the CPU 211 determines that the e-mail address cannot be obtained (NO in step S1009), the process in step S1010 is skipped, and the process ends. Thus, the operation key 515 is not displayed on the screen in FIG. 5. This is because, if the information 407 in FIG. 4 cannot be obtained, the e-mail address cannot be set using the operation key 515. The CPU 211 cannot obtain the information 407, for example, in a case where the information 407 is not registered in the authentication server 102.

Figure 11:
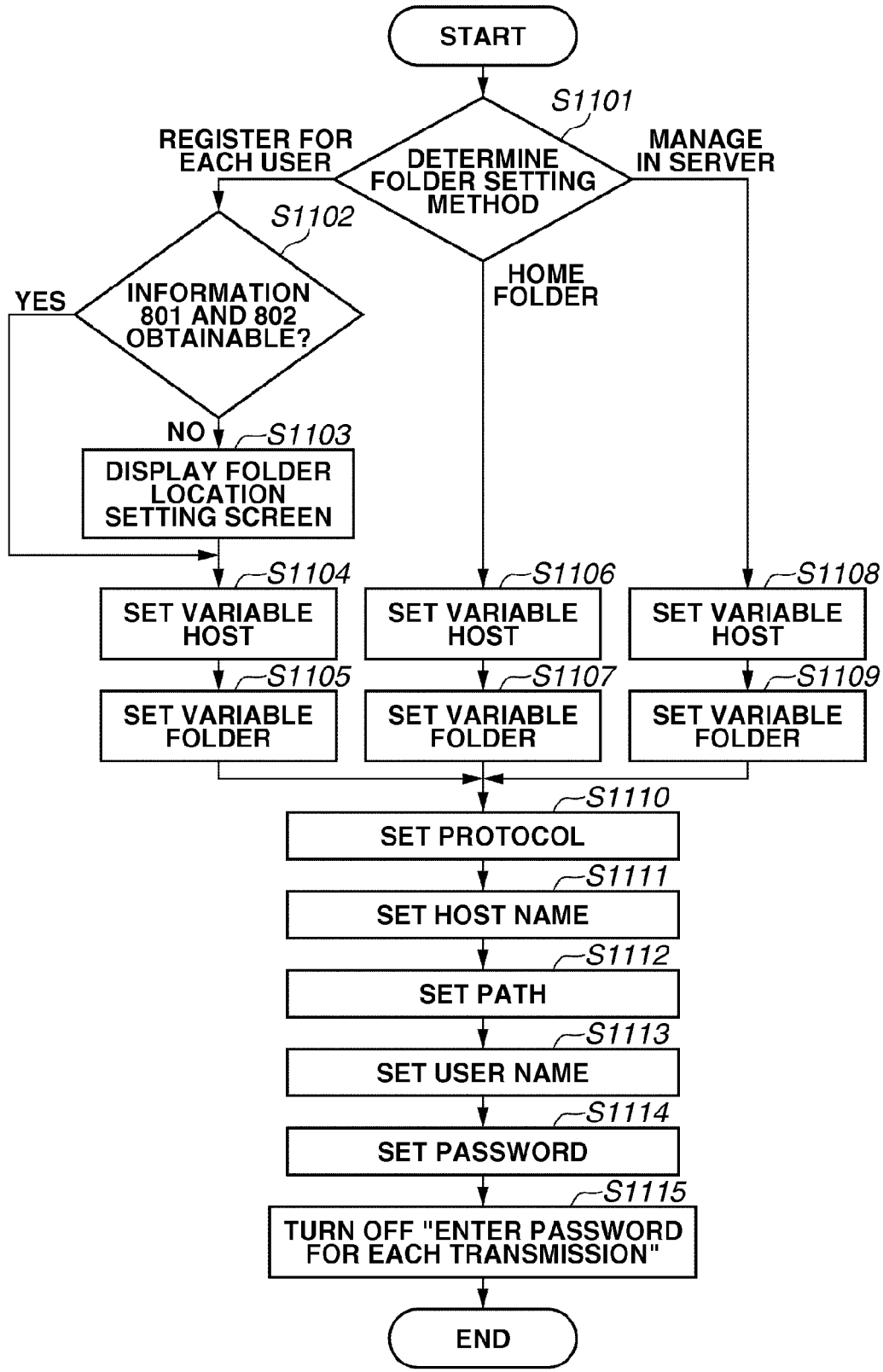
FIG. 11 is a flowchart illustrating an operation performed if "send file to myself" is selected in the MFP according to the exemplary embodiment of the present invention.

FIG. 11 is a flowchart illustrating a series of operations to be performed when the operation key 514 in FIG. 5 is operated in the MFP 101. Each operation (step) illustrated in the flowchart in FIG. 11 is realized by the CPU 211 in the MFP 101 by executing a control program stored in the HDD 214.

In step S1101, the CPU 211 determines which folder setting method has been selected. If the selected folder setting method is "register for each user", the process proceeds to step S1102. If the selected folder setting method is "home folder", the process proceeds to step S1106. If the selected folder setting method is "manage in server", the process proceeds to step S1108.

In step S1102, the CPU 211 determines whether the information pieces 801 and 802 in FIG. 8 can be obtained. If the information can be obtained, the CPU 211 determines "YES", and if the information cannot be obtained, the CPU 211 determines "NO". The CPU 211 cannot obtain the information pieces 801 and 802, for example, in a case where the information pieces 801 and 802 are not registered in the MFP 101.

If the information can be obtained (YES in step S1102), the process proceeds to step S1004. Whereas, if the information cannot be obtained, (NO in step S1102), the process proceeds to step S1103. In step S1103, the CPU 211 displays a screen for receiving an input of the folder location information from the user, and receives an input of the folder location information from the user. The folder location information received in this step can be used only once in the current transmission. Alternatively, the folder location information can be registered as the information pieces 801 and 802 in FIG. 8 so that the information can be used in the next and subsequent transmissions in the setting method "register for each user".

In step S1104, as a value of a variable HOST, the CPU 211 sets the information 801 in FIG. 8 or the information input by the user via the screen displayed in step S1103. In step S1105, as a value of a variable FOLDER, the CPU 211 sets the information 802 in FIG. 8 or the information input by the user via the screen displayed in step S1103.

In step S1106, the information 610 in FIG. 6 is set as a value of the variable HOST. In step S1107, as a value of the variable FOLDER, the CPU 211 sets a value obtained by combining the information 620 in FIG. 6 and the user name input by the user via the screen displayed in step S1001 in FIG. 10. In the examples illustrated in FIGS. 4 and 6, the value set in step S1007 is "/home/A10012".

In step S1108, a part of the information 408 in FIG. 4 is set as a value of the variable HOST. In step S1109, a remaining part of the information 408 in FIG. 4 is set as a value of the variable FOLDER. In the example illustrated in FIG. 4, the value set in step S1108 is "server.abc.co.jp", and the value set in step S1109 is "/user/tanaka".

In step S1110, the CPU 211 set a protocol to be used for file transmission of the image data. For the protocol to be used for file transmission, in a case where the destination in the address book is referred, the protocol selected in the information 901 in FIG. 9 is employed, and in a case where the destination is set by operating the operation key 514, SMB is automatically set. The SMB is automatically set because in the protocols to be used for the file transmission, SMB is most frequently used. Alternatively, another protocol, for example, FTP may be automatically set.

In step S1111, the value of the variable HOST set in steps S1104, S1106, or S1108 is set as a host name for specifying a folder to be the destination of the image data.

In step S1112, the value of the variable FOLDER set in steps S1105, S1107, or S1109 is set as a path for specifying a folder to be the destination of the image data.

In step S1113, the information of the user name input by the user via the screen displayed in step S1001 in FIG. 10 is set as a user name for accessing the folder to be the destination of the image data.

In step S1114, the information of the password input by the user via the screen displayed in step S1001 in FIG. 10 is set as a password for accessing the folder to be the destination of the image data.

As described above, the authentication information input by the user via the screen displayed in step S1001 in FIG. 10 is taken over (diverted) as the authentication information for accessing the folder to be the destination of the image data. With the processing, the authentication information for accessing the folder to be the destination of the image data is not necessary to be registered in the MFP 101 in advance, and the time and effort in the destination setting for file transmission can be reduced.

In step S1115, the CPU 211 sets the information indicating whether the user inputs the password for each transmission (the information described as the information 906 in FIG. 9) to "OFF".

Figure 12:
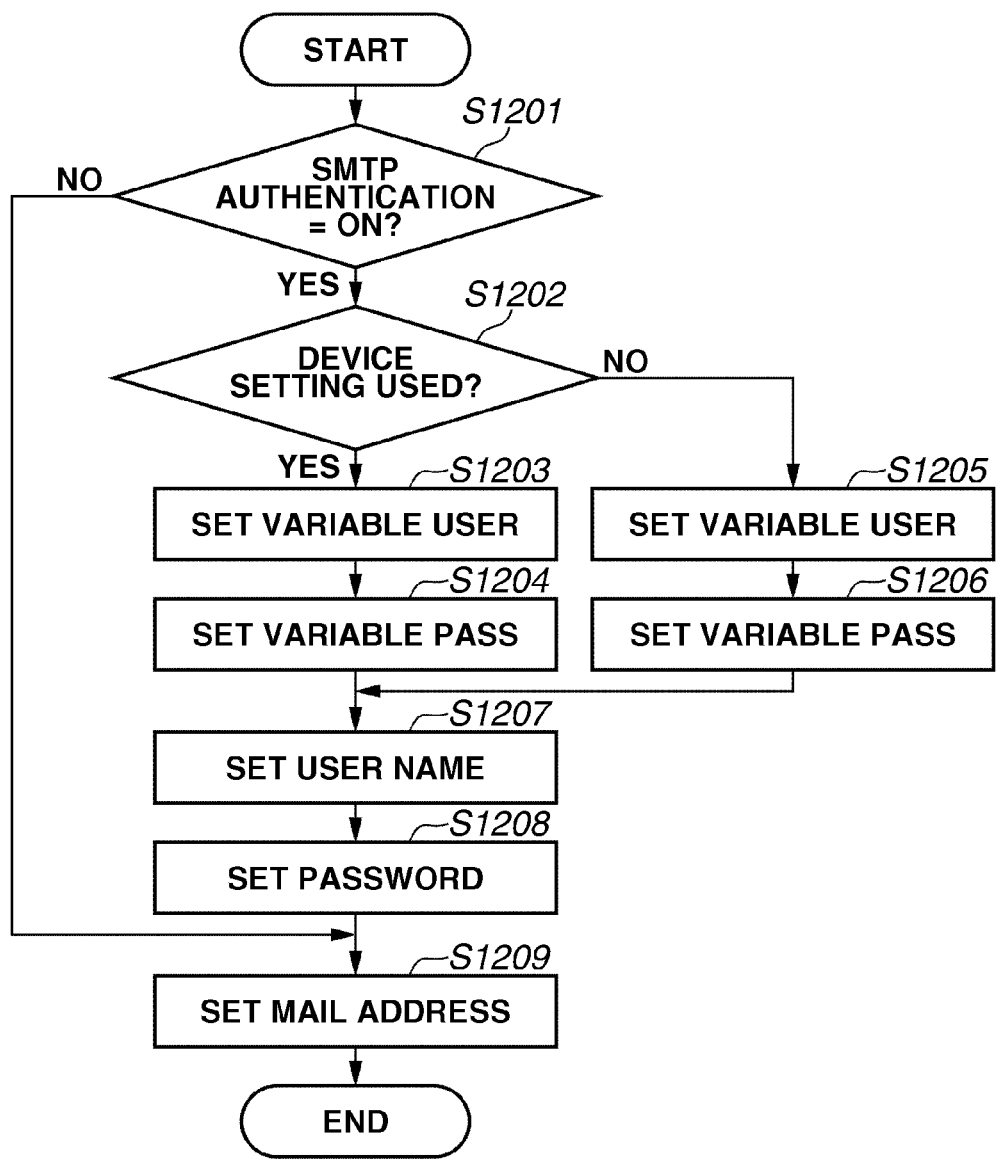
FIG. 12 is a flowchart illustrating an operation performed if "send mail to myself" is selected in the MFP according to the exemplary embodiment of the present invention.

FIG. 12 is a flowchart illustrating a series of operations to be performed when the operation key 515 in FIG. 5 is operated in the MFP 101. Each operation (step) illustrated in the flowchart in FIG. 12 is realized by the CPU 211 in the MFP 101 by executing a control program stored in the HDD 214.

In step S1201, the CPU 211 refers to the information 700 in FIG. 7, and determines whether the SMTP authentication is set to "ON". If the SMTP authentication is set to "ON" (YES in step S1201), the process proceeds to step S1202. If the SMTP authentication is not set to "ON" (NO in step S1201), the process proceeds to step S1209.

In step S1202, based on which of the operation keys 701 and 702 in FIG. 7 is operated, the CPU 211 determines which of the authentication information of "device setting" and the authentication information of "register for each user" is used for the SMTP authentication. As a result of the determination, the authentication information of "device setting" is used for the SMTP authentication (YES in step S1202), the process proceeds to step S1203. If the authentication information of "register for each user" is used for the SMTP authentication (NO in step S1202), the process proceeds to step S1205.

In step S1203, the information 720 in FIG. 7 is set as a value of a variable USER. In step S1204, the information 730 in FIG. 7 is set as a value of a variable PASS.

In step S1205, the information 803 in FIG. 8 is set as a value of the variable USER. In step S1206, the information 804 in FIG. 8 is set as a value of the variable PASS.

In step S1207, the value of the variable USER set in step S1203 or step S1205 is set as a user name to be used for the SMTP authentication.

In step S1208, the value of the variable PASS set in step S1204 or step S1206 is set as a password to be used for the SMTP authentication.

In step S1209, as a destination (To) of the image data, the CPU 211 sets the e-mail address which is registered as the information 407 in FIG. 4 in the authentication server 102 and is notified together with the information of the success of the authentication. This e-mail address is also set as the source (From) of the electronic mail.

FIG. 13 is a flowchart illustrating a series of operations to be performed when a start key (not illustrated) is operated in the MFP 101 after the destination setting via the screen in FIG. 5 is performed. Each operation (step) illustrated in the flowchart in FIG. 13 is realized by the CPU 211 in the MFP 101 by executing a control program stored in the HDD 214.

In step S1301, the CPU 211 selects the set destination (if a plurality of destinations is set, one of the destinations), and determines whether the selected destination is the destination to which the image data is sent as a file. If the CPU 211 determines that the selected destination is the destination to which the image data is sent as a file (YES in step S1301), the process proceeds to step S1302. Whereas, if not (NO in step S1301), the process proceeds to step S1304. In this case, the destination which is not determined as the destination to which the image data is sent as a file is a destination to which the image data is to be sent as an attachment of an electronic mail. However, the destination which is not determined as the destination to which the image data is sent as a file may be a destination to which the image data is sent with a protocol other than the electronic mail.

In step S1302, the CPU 211 determines whether the information (the information described as the information 906 in FIG. 9) set to the selected destination indicates that the setting the user inputs the password for each transmission is "ON". As a result of the determination, if setting the user inputs the password for each transmission is ON (YES in step S1302), the process proceeds to step S1303. If not (NO in step S1302), the process in step S1303 is skipped, and the process proceeds to step S1304.

With respect to the destination set with the operation key 514 in FIG. 5, the information indicating whether the user inputs the password for each transmission is set to OFF as described in step S1115 in FIG. 11, so that the determination result in step S1302 is to be NO. In step S1303, the CPU 211 displays a screen for receiving an input of the password from the user, and receives an input of the password from the user.

In step S1304, the CPU 211 determines whether other destinations are set. If other destinations are set (YES in step S1304), the process returns to step S1301. If other destinations are not set (NO in step S1304), the process proceeds to step S1305.

In step S1305, the image data is sent by the protocol corresponding to the set destination. If the destination is set with the operation key 514 in FIG. 5, the CPU 211 connects to the file server 103 corresponding to the host name set in step S1111 in FIG. 11 by SMB, and specifies the destination folder with the path set in step S1112. Further, the CPU 211 logs in to the file server 103 (accesses the folder) with the authentication information pieces set in steps S1113 and S1114 in FIG. 11, and sends the image data to the file server 103 (stores the image data in the folder).

If the destination is set with reference to the address book and is in compliant with the format for the file transmission, the CPU 211 connects to the file server 103 corresponding to the information 902 in FIG. 9, and specifies the destination folder with the information 903 in FIG. 9. Further, the CPU 211 logs in to the file server 103 (accesses the folder) with the information pieces 904 and 905 in FIG. 9 (or the password input in step S1303 in FIG. 13), and sends the image data to the file server 103 (stores the image data in the folder).

If the destination is set with the operation key 515 in FIG. 5, the CPU 211 logs in to the mail server (performs SMTP authentication) with the authentication information pieces set in steps S1207 and S1208 in FIG. 12. Then, the CPU 211 sends the electronic mail with the attached image data to the destination of the e-mail address set in step S1209.

The image data sent in step S1305 is generated by reading the original document with the scanner 221 in step S1305. Alternatively, other methods can be employed. For example, before the start key is operated, the reading operation of the document may be performed using another operation by the user as a trigger.

According to the above-described exemplary embodiment, the image data generated by the scanner 221 is sent. Alternatively, the present invention can be applied to sending of image data inputted by other methods, for example, a reception via a facsimile from the outside.

Further, according to the above descriptions, input of the authentication information from the user is received via the screen displayed in step S1001 in FIG. 10. Alternatively, other methods, for example, a reception of authentication information from an integrated circuit (IC) card using a card reader can be employed.

As described above, in step S1001, the MFP 101 receives an input of authentication information from a user. In step S1002, the authentication server 102 authenticates the user based on the authentication information received by the MFP 101. The MFP 101 is provided with the operation key (the operation key 514) for setting a folder of the user as a destination of the image data, and selects a method for setting the folder in a case where the operation key is operated (the operation keys 601 to 603). In steps S1101 to S1113, in response to the operation of the operation key, the MFP 101 sets the folder according to the setting method selected in advance. In step S1305, the MFP 101 sends the image data to the set folder as the destination.

Thus, the processing enables the user to selectively switch the setting methods of the folder of the user's own according to the installation environment of the MFP 101.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application is a national phase application of international application PCT/JP2013/000816, filed on Feb. 14, 2013, which is hereby incorporated by reference herein in its entirety, and this application claims priority from Japanese Patent Application No. 2012-041604, filed Feb. 28, 2012, which is hereby incorporated by reference herein in its entirety.

The invention claimed is:

1. An image processing apparatus comprising:
a reception unit configured to receive authentication information from a user;
a login unit configured to perform login of the user based on the authentication information received by the reception unit;
one key configured to set, as a storage destination of image data, path information indicating a folder;
a transmission unit configured to transmit image data to store the image data in the storage destination indicated by the path information set by the one key;
a first registering unit configured to register, as the path information which is set by the one key, first path information;
a second registering unit configured to register, as the path information which is set by the one key, second path information, the second path information being preregistered by the user; and
a designating unit configured to designate a method for determining the path information to be set by the one key from a plurality of methods including at least a first method and a second method, the first method being a method for determining path information obtained by adding a user name to the first path information, and the second method being a method for determining the second path information without adding a user name to the second path information, wherein at least one of the reception unit, the login unit, the transmission unit, the first registering unit, the second registering unit and the designating unit is implemented by a hardware processor and a memory.

2. The image processing apparatus according to claim 1, wherein the authentication information further includes a password.

3. The image processing apparatus according to claim 1, further comprising a control unit configured to display the one key in a case where the path information can be set by the one key, and configured not to display the one key in a case where the path information cannot be set by the one key, wherein the control unit is implemented by a hardware processor and a memory.

4. The image processing apparatus according to claim 1, further comprising:

a reading unit configured to read an image on an original document and generate the image data; and a transmission unit configured to transmit the image data generated by the reading unit.

5. A method for controlling an image processing apparatus which has one key configured to set, as a storage destination of image data, path information indicating a folder, the method comprising:

receiving, by the image processing apparatus, authentication information from a user;

performing, by the image processing apparatus, login of the user based on the received authentication information;

transmitting, by the image processing apparatus, image data to store the image data in the storage destination indicated by the path information set by the one key;

registering, by the image processing apparatus, as path information which is set by the one key, first path information;

registering, by the image processing apparatus, second path information, the second path information being preregistered by the user; and designating, by the image processing apparatus, a method for determining path information to be set by the one key from a plurality of methods including at least a first method and a second method, the first method being a method for determining path information obtained by adding a user name to the first path information, and the second method being a method for determining the second path information without adding a user name to the second path information.

6. A non-transitory computer readable storage medium storing control instructions for controlling an image processing apparatus which has one key configured to set, as a storage destination of image data, path information indicating a folder to perform a method, the method comprising:

receiving, by the image processing apparatus, authentication information from a user;

performing, by the image processing apparatus, login of the user based on the received authentication information;

transmitting, by the image processing apparatus, image data to store the image data in the storage destination indicated by the path information set by the one key;

registering, by the image processing apparatus, as path information which is set by the one key, first path information;

registering, by the image processing apparatus, second path information, the second path information being preregistered by the user; and designating, by the image processing apparatus, a method for determining path information to be set by the one key from a plurality of methods including at least a first method and a second method, the first method being a method for determining path information obtained by adding a user name to the first path information, and the second method being a method for determining the second path information without adding a user name to the second path information.

* * * * *